United States Patent
Chakraborty et al.

(10) Patent No.: US 11,496,164 B2
(45) Date of Patent: Nov. 8, 2022

(54) EFFICIENT MULTI-BAND TRANSMITTER

(71) Applicant: INTERNATIONAL BUSINESS MACHINES CORPORATION, Armonk, NY (US)

(72) Inventors: Sudipto Chakraborty, Plano, TX (US); Rajiv Joshi, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/199,998

(22) Filed: Mar. 12, 2021

(65) Prior Publication Data

US 2022/0294479 A1  Sep. 15, 2022

(51) Int. Cl.
*H04B 1/04* (2006.01)

(52) U.S. Cl.
CPC ....... *H04B 1/04* (2013.01); *H04B 2001/0491* (2013.01)

(58) Field of Classification Search
CPC .. H04B 1/7172; H04B 1/713; H04B 1/71632; H04B 1/71635; H04B 5/0075; H04B 5/02; H04B 1/24; H04B 1/0475; H04B 1/44; H04B 5/0037; H04B 1/0082; H04B 1/406; H04B 1/48; H04B 1/0075; H04B 1/1027; H04B 1/123; H04B 1/16; H04B 1/30; H04B 1/403; H04B 2001/0491; H04B 7/26; H04B 1/18; H04B 1/40; H04B 1/405; H04B 1/525; H04B 5/0081; H04B 1/005; H04B 1/0057; H04B 1/006; H04B 1/02; H04B 1/034; H04B 1/0458; H04B 1/28; H04B 1/3833; H04B 1/385; H04B 1/408
See application file for complete search history.

(56) References Cited

U.S. PATENT DOCUMENTS

| 5,796,772 | A  | 8/1998 | Smith et al. |
| 6,862,441 | B2 | 3/2005 | Ella |
| 7,209,720 | B2 | 4/2007 | Balasubramaniyan et al. |

(Continued)

FOREIGN PATENT DOCUMENTS

WO  2009039444 A1  3/2009

OTHER PUBLICATIONS

Anonymous, "CC1310 SimpleLink™ Ultra-Low-Power Sub-1 GHz Wireless MCU", Texas Instruments: Dallas, TX, USA, www.ti.com. Sep. 2015, pp. 1-68.

(Continued)

*Primary Examiner* — Golam Sorowar
(74) *Attorney, Agent, or Firm* — Tutunjian & Bitetto, P.C.; Samuel Waldbaum

(57) ABSTRACT

Transmitters, sensor systems, and methods of transmission include a frequency adjuster coupled to a ring oscillator to reduce latency and power consumption and to receive a signal from the ring oscillator. The frequency adjuster includes logic circuits to adjust the signal to a selected transmission frequency band. A band switch is coupled to the ring oscillator and the frequency adjuster to select logic circuits within the frequency adjuster to determine the selected transmission frequency band from a set of output frequency bands. A first radio front end is coupled to the frequency adjuster to transmit the signal on the selected transmission frequency band.

18 Claims, 6 Drawing Sheets

(56) References Cited

U.S. PATENT DOCUMENTS

| | | | |
|---|---|---|---|
| 7,652,542 B2 * | 1/2010 | Matsuno | H04B 1/71635 331/37 |
| 9,721,463 B2 | 8/2017 | Rowland et al. | |
| 10,018,488 B2 | 7/2018 | Lysen | |
| 10,412,680 B1 * | 9/2019 | Hou | H04W 52/241 |
| 2009/0030293 A1 | 1/2009 | Cooper et al. | |
| 2011/0299574 A1 * | 12/2011 | Rofougaran | H03D 7/165 375/219 |
| 2015/0244354 A1 * | 8/2015 | Parikh | H03K 5/1252 331/57 |
| 2015/0295562 A1 | 10/2015 | Agarwal et al. | |
| 2016/0178566 A1 | 6/2016 | Fife et al. | |
| 2018/0019862 A1 * | 1/2018 | Kliewer | G01D 4/00 |
| 2018/0175905 A1 * | 6/2018 | Nabki | H04L 7/0091 |
| 2020/0091918 A1 * | 3/2020 | Wang | H03L 7/107 |

OTHER PUBLICATIONS

Anonymous, "CC2650 SimpleLink Multistandard Wireless MCU", Texas Instruments: Dallas, TX, USA, www.ti.com. Feb. 2015, pp. 1-67.

Anonymous, "nRF52833: Bluetooth 5.1 SoC supporting Bluetooth Low Energy, Bluetooth mesh, Thread and Zigbee, qualified upto 105°C ambient temperature", Nordic Semiconductor. Oct. 2019, pp. 1-2.

* cited by examiner

EFFICIENT MULTI-BAND TRANSMITTER

BACKGROUND

The present invention generally relates to transmitter architectures, and, more particularly, to efficient multi-band transmitters.

Low-power sensor arrays are increasingly used for a variety of applications, including internet of things (IoT) devices, implantable devices, wearable devices, energy harvesting systems, seismic sensors, structural health monitoring systems, and multi-channel/multi-mode devices. Such transmitters may need to transmit on a variety of different frequency bands, in accordance with the demands of a particular application.

SUMMARY

A transmitter includes a frequency adjuster coupled to a ring oscillator to reduce latency and power consumption and to receive a signal from the ring oscillator. The frequency adjuster includes logic circuits to adjust the signal to a selected transmission frequency band. A band switch is coupled to the ring oscillator and the frequency adjuster to select logic circuits within the frequency adjuster to determine the selected transmission frequency band from a set of output frequency bands. A first radio front end is coupled to the frequency adjuster to transmit the signal on the selected transmission frequency band.

A sensor system includes a sensor that generates measurement data, a ring oscillator-based transmitter, and an antenna that receives a transmitted modulated signal. The ring oscillator-based transmitter includes a frequency adjuster, a band switch, and a first radio front end. The frequency adjuster is coupled to a ring oscillator to reduce latency and power consumption and to receive a signal from the ring oscillator. The frequency adjuster including logic circuits to adjust the signal to a selected transmission frequency band. The band switch is coupled to the ring oscillator and the frequency adjuster to select logic circuits within the frequency adjuster to determine the selected transmission frequency band from a set of output frequency bands. The first radio front end is coupled to the frequency adjuster to modulate the measurement data onto the signal and to transmit the signal on the selected transmission frequency band.

A method for transmitting a signal includes tuning a ring oscillator output to a base frequency to reduce latency and power consumption. The ring oscillator output is switched to a selected transmission band using a frequency adjuster. The ring oscillator output is adjusted to a second frequency on the selected transmission band using multiple phase outputs of the ring oscillator. The adjusted signal is transmitted at the selected transmission band.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

A transmitter may include a single, low-power base oscillator, which may generate a base frequency signal that may then be tuned and modulated for transmission across multiple different bands. For example, a ring oscillator that operates at about 900 MHz can generate a base frequency signal that, when it is multiplied or divided and tuned appropriately, can be used to transmit on a variety of industrial, scientific, and medical (ISM) radio bands and other useful radio frequencies. Such an architecture can provide a high bandwidth and data rate, with low power consumption, and fast wake-up time, in addition to being deployable in many different environments, with heterogeneous hardware.

Figure 1:
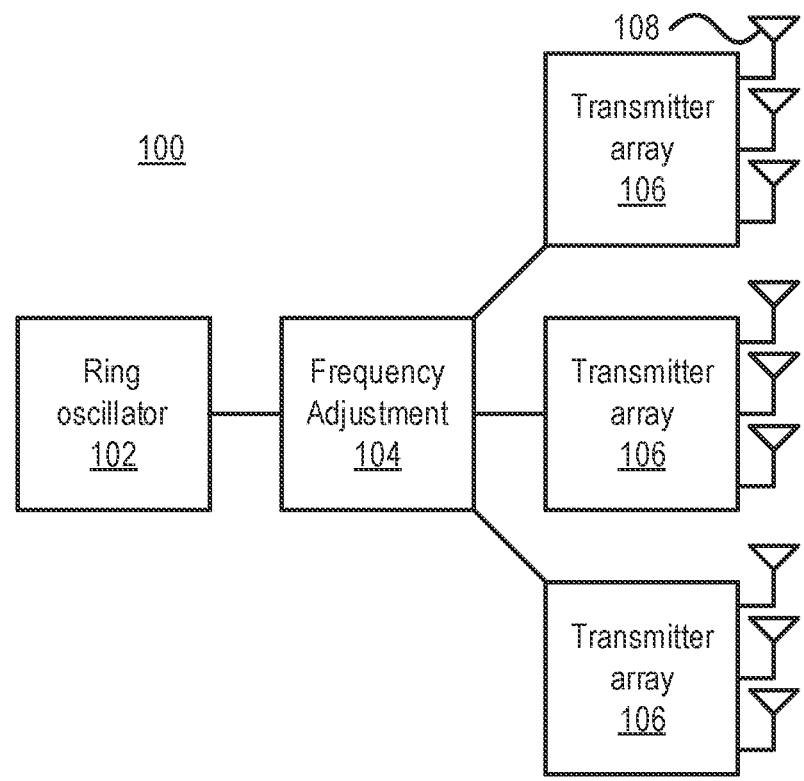
FIG. 1 is a block diagram of a transmission system that uses a ring oscillator to generate a base frequency, which is then adjusted to one of a set of different transmission bands, in accordance with an embodiment of the present invention.

Referring now to FIG. 1, an exemplary transmitter system 100 is shown. A ring oscillator 102 generates a base frequency signal, with a frequency that is based on the physical properties of the oscillator and its components. The base frequency signal is adjusted at frequency adjustment 104, for example by multiplying or dividing the frequency of the base frequency signal, before passing to a transmitter array 106. Each transmitter array 106 is configured to transmit signals using one or more antennas 108 at a different respective frequency band. Each of these components is described in greater detail below.

Although multiple different transmitter arrays 106 (also known as radio front ends) are shown, each with a respective set of antennas 108, it should be understood that other embodiments may include a single radio front-end with multiple drivers, each handling a different respective frequency, and feeding a single antenna system using a multiple-input matching network, as described in greater detail below.

Figure 2:
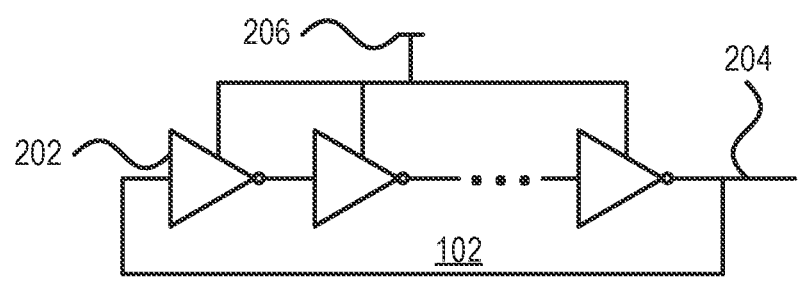
FIG. 2 is a schematic diagram of a ring oscillator that can be used to generate a base frequency for a digitally synthesizable transmitter, in accordance with an embodiment of the present invention.

Referring now to FIG. 2, an exemplary ring oscillator 102 is shown. A ring oscillator 102 may be formed as a series of inverters 202 with feedback, so that an output of the final inverter 202 feeds back to the input of the first inverter 202. An odd number of inverters 202 may be used, so that when the final inverter 202 inverts its input signal, it will invert the input signal to the first inverter 202. As a result, an output signal 204 of the ring oscillator 102 will invert periodically, with the period depending on the number of inverters 202 in the ring oscillator 102 and a signal propagation delay that is associated with each such inverter 202. This is just one contemplated architecture for a ring oscillator. The ring oscillator 102 may have multiple outputs 204, each at different points of the ring, to provide different phases.

The inverters 202 may be implemented as, e.g., complementary metal-oxide semiconductor (CMOS) inverters. Such a structure may be formed from a p-channel metal-oxide semiconductor (PMOS) transistor and an n-channel metal-oxide semiconductor (NMOS) transistor, connected in series. The respective transistors turn on when a threshold voltage is reached, thereby changing the output of that delay stage. Some small amount of time is needed for charge to accumulate to this point, making up the inversion delay. Thus, each inverter 202 will contribute to the total period of the ring oscillator 102. The delay may be adjusted by affecting the delay of each inverter stage 202, for example by changing a bias voltage value or by changing a capacitance. Thus, a whole range of different frequencies can be generated by the ring oscillator 102, in accordance with the delay of each of the inverters. Although CMOS-based inverters are specifically contemplated, it should be understood that any appropriate delay element may be used instead of this structure.

A voltage 206 may be applied to start the oscillation, and the oscillation will continue as long as the voltage is maintained. Additionally, the frequency may be tuned by altering the input voltage, which changes the signal propagation delay for the inverters 202. An increased input voltage may decrease the propagation delay, thereby increasing the frequency of the output signal 204. This voltage may be about 0.5V, making it possible to run the oscillator from low-voltage power sources, such as solar cells, coin batteries, and energy harvesters. Using such low-power operation, a ring oscillator-based transistor may be helpful in embedded sensor systems, where limited power may be available and where it may be inconvenient to manually replace depleted power sources.

The frequency may also be tuned by controlling an array of tuning capacitors, with each capacitor in the array being associated with a respective inverter 202. The tuning capacitors control the rate at which the respective inverters 202 are charged, and so control the rate at which a signal propagates through the ring oscillator 102.

These tuning capacitors may have a capacitance that can switch between a high-capacitance mode and a low-capacitance mode, providing for a range of frequency tuning between the state where all of the inverters 202 have their respective tuning capacitors in a high-capacitance mode, and a state where all of the inverters 202 have their respective tuning capacitors in a low-capacitance mode. The operation of the tuning capacitors thereby changes the inversion delay of the respective inverter 202 between a high-capacitance value and a low-capacitance value. The resulting frequency of the ring oscillator 102 may then be determined as:

$$f = \frac{1}{2(t_h n + t_l(1-n))}$$

where $t_h$ is the high-capacitance value of the inverter delay, $t_l$ is the low-capacitance value of the inverter delay, and n is a fraction of the inverters 202 in the high-capacitance configuration. It should be understood that capacitors with more than two capacitance states are also contemplated, and their contribution to the ring oscillator frequency may be adjusted accordingly.

A ring oscillator 102 may settle within one clock period of the clock frequency. For example, if a ring oscillator operates at 2 GHz, then it would settle within about 500 ps. This contrasts to L/C oscillators, which may take an amount of time that is a multiple of the fundamental period, depending on the quality factor of the L/C oscillator's resonator tank. For example, with a quality factor of 10, an L/C oscillator may take 5 ns to settle. The shorter wakeup time of ring oscillators makes it possible to perform transmit and receive functions with very low latency. As a result, a sensor system that uses such an oscillator for transmissions may keep the oscillator turned off when not needed, providing a power saving without compromising latency. Additionally, because the oscillator needs to run far less time before settling, the ring oscillator may waste significantly less energy during startup than an L/C oscillator.

Multiple phases may be extracted from the ring oscillator 102 by including multiple outputs 204. The different outputs will sample the oscillating signal at different points in its wavelength. Any number of such outputs 204 may be used, establishing any number of delay cells. For example, with N delay cells, two phases may be obtained that are 180/N degrees apart. Thus, with two delay cells (two outputs 204), the phases may be placed 90° apart, or roughly one quarter of the length of the ring oscillator 102. In some cases, different outputs 204 may be used to realize different phase granularities. Any configuration with an even number of evenly spaced outputs 204 will have outputs that are 90° apart, which may be used for in-phase and quadrature signal generation.

The length of the ring oscillator 102 may be selected to produce a base frequency for the output signal 204 that is the geometric mean of the extreme frequencies of the bands that will be used. For example, consider a transmitter 100 that will transmit on the following ISM bands: 170 MHz, 315 MHz, 433 MHz, 900 MHz, 2400 MHz, and 5200 MHz. The lowest frequency is 170 MHz and the highest frequency is 5200 MHz, making the geometric mean (940 MHz) close to 900 MHz. As such, the base frequency of the output signal may be set to 900 MHz, which may be used directly for 900 MHz operation, and which may be adjusted to operate on higher or lower frequency bands. Although these frequency bands are specifically contemplated, it should be understood that any appropriate frequency bands may be used instead, including those that are higher in frequency than 5200 MHz and those that are lower in frequency than 170 MHz. Additionally, while bands that are roughly integer multiples of one another are specifically contemplated, it should be understood that bands may be used which do not conform to this pattern, if appropriate changes are made to the frequency adjustment block 104.

Figure 3:
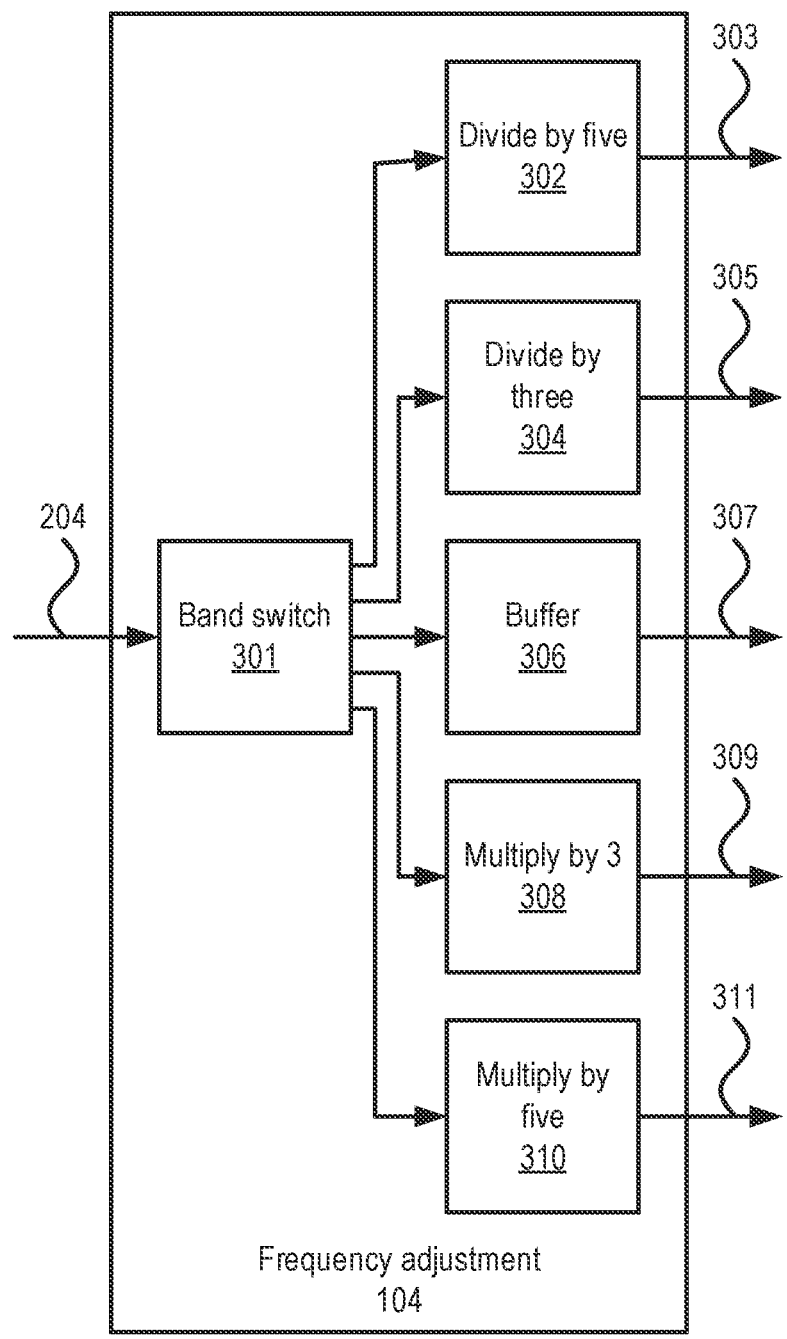
FIG. 3 is a block diagram of a frequency adjuster that adjusts the base frequency to a selected transmission frequency, in accordance with an embodiment of the present invention.

Referring now to FIG. 3, additional detail on frequency adjustment block 104 is shown. The output signal 204 from the ring oscillator 102 is processed by a band switch 301, which is controlled to select which band or bands will be used for transmission. In this example, the signal 204 from the ring oscillator may be set to a base frequency of 900 MHz. The frequency adjustment block 104 takes a single input and generates one of five different outputs, corresponding to five different bands. It should be understood that more or fewer bands may be used instead, in accordance with the communications needs of the device.

A set of frequency adjusters are shown that convert the base frequency of the signal 204 to a transmission band, selected from any of a set of different bands. For example, using an input of 900 MHz, a divide by five frequency divider 302 generates a signal 303 at 180 MHz, which can be tuned into the range of the 170 MHz band. A divide by three frequency divider 304 generates a signal 305 at 300 MHz, which can be tuned into the range of the 315 MHz band. A buffer 306 can be used to provide an output signal 307 at 900 MHz, the same as the signal 204 from the ring oscillator 102. A multiply by three frequency multiplier 308 generates a signal 309 at 2700 MHz, which can be tuned into the range of the 2400 MHz band. A multiply by five frequency multiplier generates a signal 311 at 5400 MHz, which can be tuned into the range of the 5200 MHz. Other frequencies, such as a 433 MHz output, can be reached using similar circuits. For example, a 433 MHz output can be generated by dividing the frequency of the output signal 204 by two, producing 450 MHz, which can be tuned into the range of 433 MHz.

For example, the divide by five frequency divider 302 and the divide by three frequency divider 304 may be implemented with a frequency divider and a capacitive digital to analog converter phase multiplexer, which can divide the base frequency to any appropriate fraction. This can be performed by using multiple phases from the ring oscillator 102, with the capacitive digital to analog converter to generate a sinusoidal signal.

For frequency multiplication, signals with orthogonal phases may be merged to provide an output signal at a frequency multiple of the input signal. Such orthogonal phases may be generated from the different outputs 204 of the ring oscillator 102. For the higher-frequency outputs, filtering can be performed using passive elements in resonance. The frequency multipliers may thus be implemented as, e.g., distinct logic circuits. For example, XOR circuits having phase-shifted inputs may be used. In one case, an XOR3 circuit may multiply a frequency of an input by a factor of three, if the input signal is applied to the three inputs of the XOR3 circuit with different amounts of phase shift.

Figure 4:
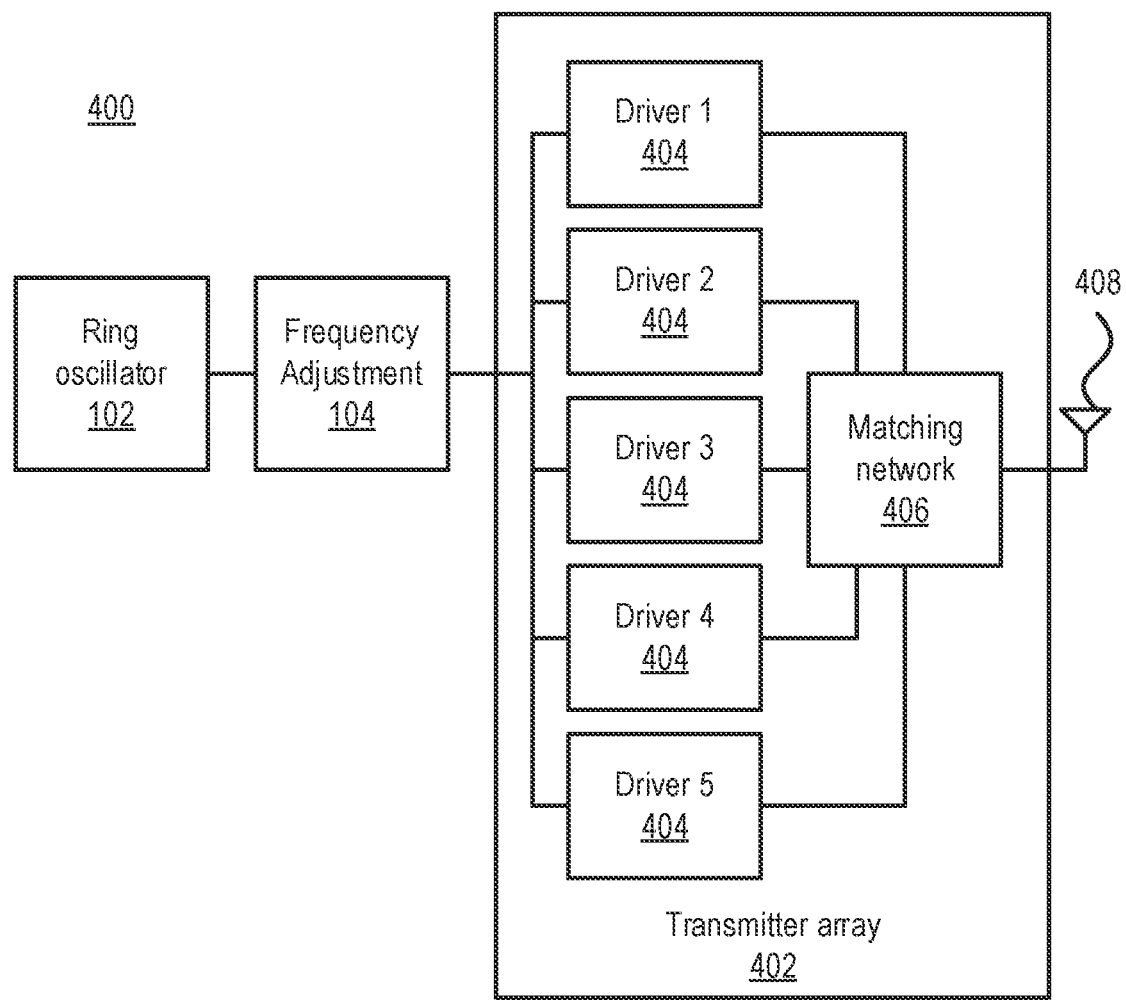
FIG. 4 is a block diagram of a transmission system that uses a ring oscillator to generate a base frequency, which is then adjusted to one of a set of different transmission bands, in accordance with an embodiment of the present invention.

Referring now to FIG. 4, an exemplary transmitter system 400 is shown. Rather than feeding separate transmitter arrays, in this case the frequency adjustment 104 may output to a transmitter array 402 having multiple drivers 404. Each driver 404 may receive a different respective frequency input from the frequency adjustment block 104. The drivers 404 may then output a respective transmission signal. Each of the drivers 404 may be separately configured as, e.g., single-ended or differential drivers. A matching network 406 matches impedance between the operating driver 404, which provides the transmission at its respective input frequency, and an antenna 408 or antenna array.

During operation, any of the drivers 404 may be enabled at a given time, with the rest being turned off. The antenna 408 may be a wide-band antenna that supports closely spaced frequency bands, covering the tuning range of the base frequency. Following the above examples of the bands in use, the antenna 408 may have a standing wave ratio (SWR) of less than 1:1.5 over an exemplary frequency range of 868-915 MHz. The matching network 406 provides resonance at any of the respective input frequencies. Thus, on-chip drivers can be configured as single-ended or differential as needed.

Figure 5:
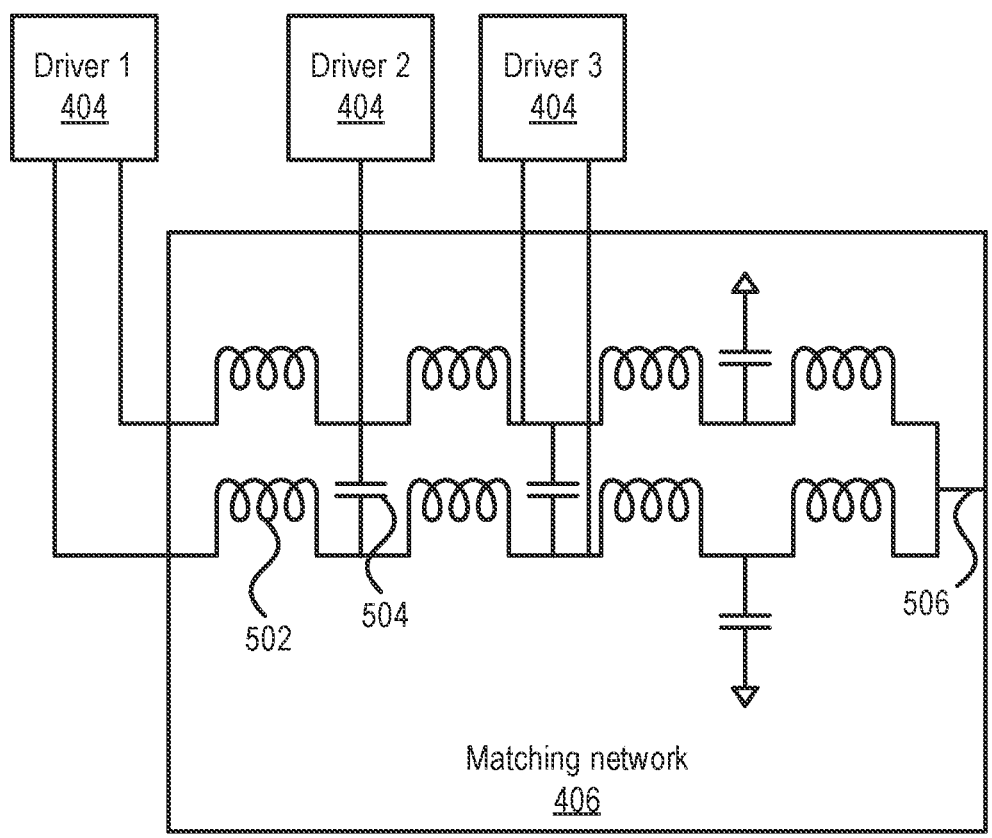
FIG. 5 is a schematic diagram of a matching network that accepts inputs from a set of different drivers, operating at different frequencies, and matches them to an antenna, in accordance with an embodiment of the present invention.

Referring now to FIG. 5, additional detail on the matching network 406 is shown. The matching network 406 is configured to accept inputs from all of the different drivers 404, with a number of connections between the drivers 404 and the matching network 406 reflecting whether the respective driver 404 is in a single-ended configuration or a differential configuration. Only a subset of drivers 404 are shown in FIG. 5 for the sake of simplicity, but it should be understood that any number of drivers 404 may be connected to such a matching network 406.

A set of drivers 404, operating at different respective frequencies, provide inputs to the matching network 406 at different stages, with the inductors 502 and capacitors 504 having values that are selected to provide impedance matching to a single output impedance 506, matching to the antenna 408. As shown, the first and third drivers 404 are configured to provide a differential output, while the second driver 404 is configured to provide a single-ended output. The inductors 502 may have exemplary inductances between about 1 nH and about 5 nH, and the capacitors 504 may have exemplary capacitances between about 1 pF and about 3 pF. These values are selected to adjust the effective impedance of the antenna 408 to be appropriate for resonance with the output frequency of the selected driver 404.

Figure 6:
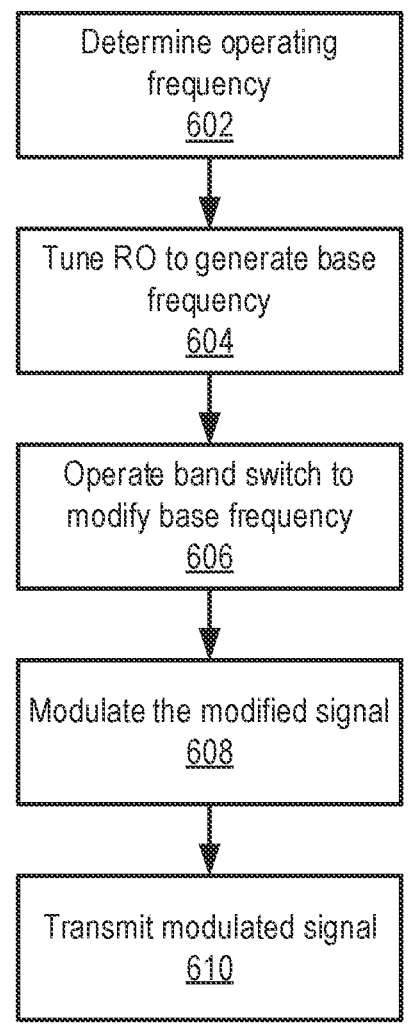
FIG. 6 is a block/flow diagram of a method for transmitting a signal using a ring oscillator to generate a base frequency, then adjusts the base frequency to one of a set of different transmission bands, in accordance with an embodiment of the present invention.

Referring now to FIG. 6, a method for transmitting a signal is shown. Block 602 determines an operating frequency, among multiple available bands and the respective frequency ranges for each of the bands. This selection may be made in accordance with any of a number of factors, for example including an operating frequency of a device available in the environment, regulatory considerations, noise levels, etc.

Block 604 then tunes the ring oscillator 102 to generate a corresponding frequency on the base band. For example, if a frequency is selected in the 170 MHz band, then block 604 tunes the local oscillator 102 to a frequency that, when it is adjusted by frequency adjuster 104, will produce the operating frequency. As described above, this may be performed by adjusting capacitances at each delay stage of the ring oscillator 102.

Block 606 then operates the band switch 301 to connect the output(s) of the local oscillator to a respective modification block, corresponding to the band that includes the operating frequency. In some cases, this band switch 301 may include a switch that selectively connects the local oscillator to the respective modification block. In some cases, the band switch 301 may control power to the respective transmitter array 106 or the respective driver 404 that corresponds to the operating frequency.

Block 608 modulates the modified signal with any appropriate data signal, using any appropriate modulation scheme. For example, quadrature amplitude modulation (QAM) may be used to encode data onto the signal by altering the amplitudes of an in-phase and quadrature version of the signal. It should be understood that many modulation schemes exist, and that any appropriate modulation scheme may be selected, in accordance with design priorities and channel characteristics. In another example, phase-shift keying may be used, for example by adjusting the phase of a phase-locked loop. Modulation may be implemented at any appropriate stage, after the frequency has been adjusted.

Block 610 then transmits the modulation signal. This transmission may be performed using one or more antennas, for example in a phased array configuration, to provide a signal that is directed to a particular target. Thus, block 210 may configure the antenna(s) in accordance with a particular beam steering direction by providing multiple output signals, phase-shifted with respect to one another, to different respective antennas.

In some cases, the entire transmitter and receiver can be synthesized using digital logic. This is particularly useful for designing radios in scaled CMOS nodes, and for faster time to market solutions. The entire radio can be designed using standard logic cells provided in a digital technology, and be targeted for lower power.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Figure 7:
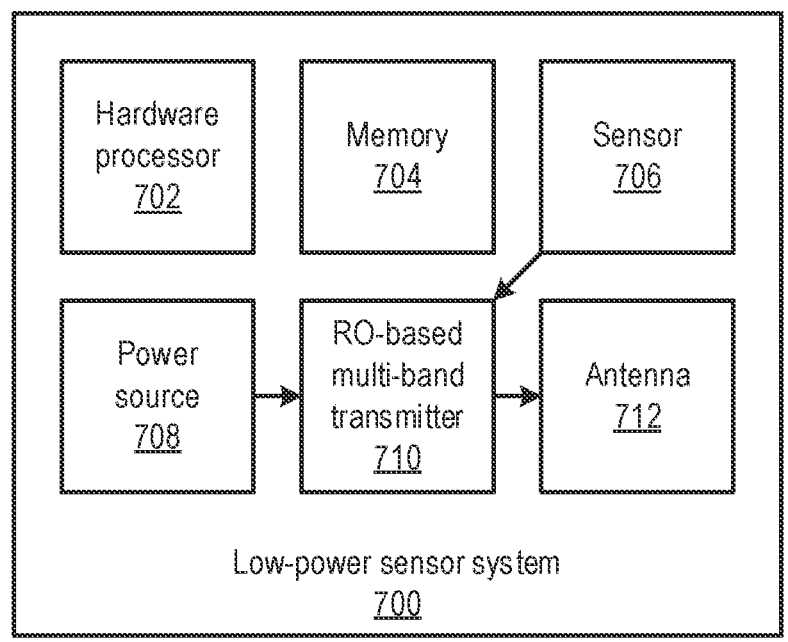
FIG. 7 is a block diagram of a low-power sensor system that uses a ring oscillator-based transmitter to transmit sensor data on any of a set of different transmission bands, in accordance with an embodiment of the present invention.

Referring now to FIG. 7, an exemplary low-power sensor system 700 is shown. The system 700 includes a hardware processor and a memory 704. Sensor 706 may include one or more sensor components, each providing a measurement of one or more phenomena. For example, the sensor 706 may be an electromagnetic sensor, capable of detecting electromagnetic radiation, such as an infrared sensor or a light sensor. Other examples of sensors include pressure sensors, sound sensors, vibration sensors, temperature sensors, humidity sensors, chemical sensors, etc. Sensor 706 may be on-board, as shown, or may communicate with the system 700 by any appropriate communications interface and protocol.

A power source 708 provides electrical power to a ring oscillator-based multi-band transmitter 710. The power source 708 may be any appropriate source, such as a battery, a solar cell, a vibrational power generator, a piezoelectric power generator, any appropriate on-board or off-board power generator, or an external power source. It is specifically contemplated that the power source 708 may have a relatively small size, making it possible to implement the system 700 in a cost-effective and space-efficient manner.

The transmitter 710 uses a ring oscillator 102 to provide a base frequency signal in a manner that is more efficient than L/C tank oscillators. The transmitter 710 adjusts the signal from the base frequency to any appropriate transmission band. The transmitter 710 may modulate data onto the adjusted signal, for example modulating the signal to include measurements from sensor 706.

The transmitter 710 provides the modulated signal to antenna 712. Antenna 712 may use any appropriate antenna configuration, such as a single wide-band antenna or a phased antenna array. In some cases, antenna 712 may include a different antenna configuration for each band that may be used by the transmitter 710. In some cases, antenna 712 may include an antenna configuration for a single band, in which case the transmitter 710 may include a matching network 406 to bring antenna 712 into resonance at the transmission frequency.

In some cases, antenna 712 may include a phased array that has multiple antenna elements. In such cases, each of the antenna elements may transmit the same signal, but phase-shifted by differing amounts. The transmitted signals interfere with one another, in some places constructively and in some places destructively, providing a potentially very focused transmission pattern. The transmitter 710 may therefore include a phase shifter on each transmission path leading to the respective antenna elements of antenna 712, and the phase values of these phase shifters may be adjusted in accordance with particular beam patterns.

Having described preferred embodiments of an efficient multi-band transmitter (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A transmitter, comprising:
   a frequency adjuster coupled to a ring oscillator to reduce latency and power consumption and to receive a signal from the ring oscillator, the frequency adjuster including logic circuits to adjust the signal to a selected transmission frequency band;
   a band switch coupled to the ring oscillator and the frequency adjuster to select logic circuits within the frequency adjuster to determine the selected transmission frequency band from a plurality of output frequency bands; and a first radio front end coupled to the frequency adjuster to transmit the signal on the selected transmission frequency band, the first radio front end comprising a plurality of drivers, wherein the frequency adjuster outputs signals on all of the plurality of output frequency bands to respective drivers of the plurality of drivers and wherein the band switch selectively provides power to one of the drivers in accordance with the selected one of the plurality of output frequency bands.

2. The transmitter of claim 1, wherein the ring oscillator includes multiple different phase outputs at different points along a length of the ring oscillator, each providing a different respective phase of the signal from the ring oscillator, wherein the frequency adjuster uses the multiple phases to adjust the signal.

3. The transmitter of claim 1, wherein the ring oscillator comprises a plurality of delay elements, each of the plurality of delay elements having a respective controllable capacitance to adjust a delay time for tuning.

4. The transmitter of claim 1, wherein the logic circuits include a frequency multiplier and a frequency divider, with respective outputs on a second frequency band and a third frequency band from the plurality of output frequency bands.

5. The transmitter of claim 4, wherein the frequency divider is an XOR circuit that takes multiple different phase inputs from the ring oscillator.

6. The transmitter of claim 1, further comprising at least one additional radio front end that is configured to transmit on a different one of the plurality of output frequency bands.

7. The transmitter of claim 1, wherein the transmitter is a digitally synthesized transmitter, using digital logic.

8. A sensor system, comprising:
a sensor that generates measurement data;
a ring oscillator-based transmitter, comprising:
a frequency adjuster coupled to a ring oscillator to reduce latency and power consumption and to receive a signal from the ring oscillator, the frequency adjuster including logic circuits to adjust the signal to a selected transmission frequency band;
a band switch coupled to the ring oscillator and the frequency adjuster to select logic circuits within the frequency adjuster to determine the selected transmission frequency band from a plurality of output frequency bands; and
a first radio front end coupled to the frequency adjuster to modulate the measurement data onto the signal and to transmit the signal on the selected transmission frequency band, the first radio front end comprising a plurality of drivers, wherein the frequency adjuster outputs signals on all of the plurality of output frequency bands to respective drivers of the plurality of drivers and wherein the band switch selectively provides power to one of the drivers in accordance with the selected one of the plurality of output frequency bands; and
an antenna that receives the transmitted modulated signal.

9. The transmitter of claim 8, wherein the ring oscillator includes multiple different phase outputs at different points along a length of the ring oscillator, each providing a different respective phase of the tunable signal, wherein the frequency adjuster uses the multiple phases to adjust the signal.

10. The transmitter of claim 8, wherein the ring oscillator comprises a plurality of delay elements, each of the plurality of delay elements having a respective controllable capacitance to adjust a delay time for tuning.

11. The transmitter of claim 8, wherein the logic circuits include a frequency multiplier and a frequency divider, with respective outputs on a second frequency band and a third frequency band.

12. The transmitter of claim 11, wherein the frequency divider is an XOR circuit that takes multiple different phase inputs from the ring oscillator.

13. The transmitter of claim 8, further comprising at least one additional radio front end that is configured to transmit on a different one of the plurality of output frequency bands.

14. The transmitter of claim 13, wherein the band switch outputs signals on different bands of the plurality of output frequency bands to different respective radio front ends.

15. A method for transmitting a signal, comprising:
tuning a ring oscillator output to a base frequency to reduce latency and power consumption;
switching the ring oscillator output to a selected transmission band using a frequency adjuster;
adjusting the ring oscillator output to a second frequency on the selected transmission band using multiple phase outputs of the ring oscillator;
powering one of a plurality of drivers that corresponds to the selected transmission band to drive the adjusted ring oscillator output; and
transmitting the adjusted signal on the selected transmission band.

16. The method of claim 15, wherein the ring oscillator includes a plurality of inverter-based delay elements, each delay element including a controllable capacitance.

17. The method of claim 16, wherein tuning the ring oscillator output includes controlling the controllable capacitance of each of the inverter-based delay elements to adjust an oscillation frequency of the ring oscillator.

18. The method of claim 15, further comprising modulating a data signal onto the adjusted ring oscillator output before transmitting the adjusted signal.

* * * * *